(12) United States Patent
Ogasawara

(10) Patent No.: US 11,734,413 B2
(45) Date of Patent: Aug. 22, 2023

(54) INFORMATION PROCESSING DEVICE AND METHOD FOR MANAGING HISTORY INFORMATION OF INFORMATION PROCESSING DEVICE

(71) Applicant: SHARP KABUSHIKI KAISHA, Sakai (JP)

(72) Inventor: Kenji Ogasawara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 249 days.

(21) Appl. No.: 17/335,778

(22) Filed: Jun. 1, 2021

(65) Prior Publication Data
US 2021/0382983 A1   Dec. 9, 2021

(30) Foreign Application Priority Data
Jun. 3, 2020   (JP) ................................. 2020-096959

(51) Int. Cl.
G06F 21/46 (2013.01)
G06F 11/30 (2006.01)
G06F 21/71 (2013.01)
G06F 21/31 (2013.01)

(52) U.S. Cl.
CPC .......... *G06F 21/46* (2013.01); *G06F 11/3079* (2013.01); *G06F 21/31* (2013.01); *G06F 21/71* (2013.01)

(58) Field of Classification Search
None
See application file for complete search history.

(56) References Cited

U.S. PATENT DOCUMENTS

| | | | |
|---|---|---|---|
| 7,636,500 B1* | 12/2009 | Arant | G06Q 30/06 715/744 |
| 10,148,644 B2* | 12/2018 | Hosoda | H04L 63/083 |
| 2009/0293006 A1* | 11/2009 | Sunagawa | H04N 1/00493 715/764 |
| 2011/0010719 A1* | 1/2011 | Watanabe | G06F 21/10 718/102 |
| 2011/0066653 A1* | 3/2011 | Uruma | G06F 21/552 707/821 |
| 2013/0235428 A1* | 9/2013 | Ohta | H04N 1/32122 358/1.16 |
| 2016/0321450 A1* | 11/2016 | Liu | G06F 21/45 |
| 2018/0032020 A1* | 2/2018 | Shintani | G03G 15/70 |
| 2019/0158685 A1* | 5/2019 | Okuma | G06F 3/1204 |

FOREIGN PATENT DOCUMENTS

JP   2004-310372 A   11/2004

* cited by examiner

Primary Examiner — James R Turchen
(74) Attorney, Agent, or Firm — ScienBiziP, P.C.

(57) ABSTRACT

An information processing device includes: an operation processor; a storage in which an initial password being an initial setting of an administrator password is prestored; a logger that logs details of operations inputted using the operation processor, in the storage as operation history information; a password entry monitor that confirms whether or not the administrator password has been entered; a password changer that changes, upon a confirmation that a password differing from the initial password has been entered, the administrator password and stores the entered password as a new administrator password; and a log presenter that presents the operation history information when the administrator password has been changed.

9 Claims, 9 Drawing Sheets

FIG. 2

| ADMINISTRATOR PASSWORD | INITIAL PASSWORD | KPW0 | KANOLD0 |
|---|---|---|---|
| | CHANGED PASSWORD | KPW1 | KANNEW1 |
| | INPUT PASSWORD | INPW | KANNEW1 |

(INITIAL SETTING OF CHANGED PASSWORD KPW1: KANOLD0)

| PASSWORD FLAG | PWFLG | T | (CHANGED) |
|---|---|---|---|
| | | F | (UNCHANGED) |

| LOG PRESENTATION METHOD INFORMATION | DISPLAYING |
|---|---|
| | PRINTING |
| | DATA COMMUNICATION |

FIG. 3

OPERATION HISTORY INFORMATION

| HISTORY NUMBER | USER NAME | DATE | DETAILS OF OPERATIONS ||
|---|---|---|---|---|
| | | | OPERATION ITEM | OPERATION SETTING INFORMATION |
| 1 | ADMINISTRATOR KA | 2019/9/18, 14:55:30 | ADMINISTRATOR SETTING | USER ADDITION : USER22 |
| 2 | ADMINISTRATOR KA | 2019/9/18, 15:05:05 | ADMINISTRATOR SETTING | REGISTERING IP ADDRESS :192.168.2.11 |
| 3 | USER 01 | 2019/9/19, 12:20:38 | USER OPERATION | FAXING :06-1234-5678 |
| 4 | USER 05 | 2019/9/21, 09:23:53 | USER OPERATION | SCAN TRANSMISSION : abc.cloudstorage.com |
| 5 | ADMINISTRATOR KA | 2019/9/21, 18:50:47 | ADMINISTRATOR SETTING | DISPLAYING REGISTERED USER LIST |

FIG. 4

INITIAL SETTING MENU SCREEN
(AFTER ADMINISTRATOR PASSWORD HAS BEEN CHANGED)

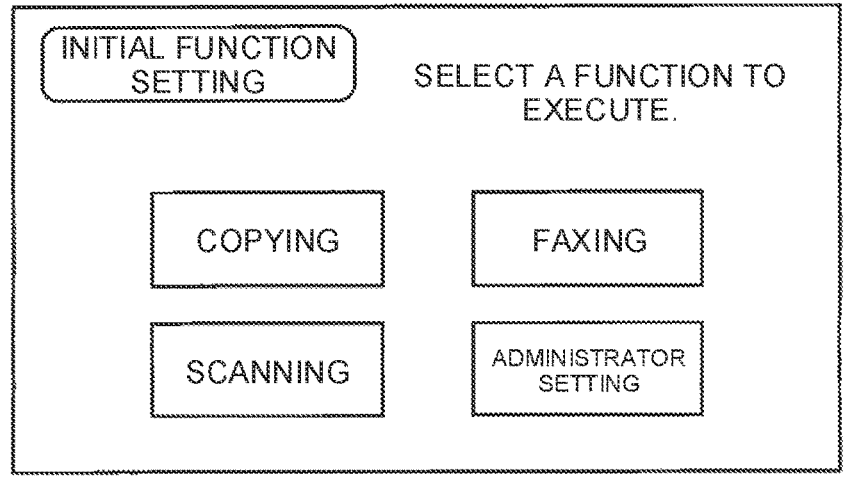

INITIAL SETTING MENU SCREEN
(BEFORE ADMINISTRATOR PASSWORD IS CHANGED)

ADMINISTRATOR SETTING MENU SCREEN

FIG. 7

ADMINISTRATOR PASSWORD ENTRY SCREEN

| ADMINISTRATOR SETTING | ENTER THE ADMINISTRATOR PASSWORD. |
|---|---|
| ADMINISTRATOR PASSWORD | ****** |

[ OK ] [ CANCEL ]

FIG. 8

ADMINISTRATOR INFORMATION SETTING SCREEN

ADMINISTRATOR INFORMATION — ENTER ADMINISTRATOR INFORMATION.

| NEW PASSWORD | KANNEW11 |
|---|---|
| NEW PASSWORD | KANNEW11 |
| E-MAIL | aaa@bbb.co.jp |
| TELEPHONE NUMBER | 06-2222-7777 |

[ OK ] [ CANCEL ]

ADMINISTRATOR PASSWORD MISMATCH WARNING SCREEN

INFORMATION PROCESSING DEVICE AND METHOD FOR MANAGING HISTORY INFORMATION OF INFORMATION PROCESSING DEVICE

BACKGROUND OF THE INVENTION

Field of the Invention

The present invention relates to information processing devices and methods for managing history information of the information processing devices, and more particularly to an information processing device having a function of authenticating an administrator using a password and a method for managing history information of the information processing device.

Description of the Background Art

Conventional information processing devices, such as personal computers, mobile terminals, and image forming apparatuses, include one that has an authentication function involving the use of a user-specific ID and password, so that only pre-registered users and administrators can use the information processing device.

For example, Japanese Unexamined Patent Application Publication No. 2004-310372 discloses a method for setting a password for user authentication between a device being used by a user and a communication terminal that are connected via a network. According to this method, the user authentication is performed through the user entering a password in the communication terminal in a case where the password of the user has been already set in the device. In a case where the password of the user has not been set in the device, the user is requested to set a password by entering the password twice in the communication terminal. The password is stored in the device if the password entered for the second time matches the password entered for the first time. An application screen is outputted after the user has been successfully authenticated. Thus, the use of the device without setting a password is prevented.

Conventional information processing devices also include one that requests an administrator of the information processing device to change an initial administrator password preset in the information processing device at the time of the first start-up of the information processing device accompanying installation of the information processing device.

Such devices that request the administrator to change the administrator password include one that does not allow functions available in the information processing device to be executed until the administrator password has been changed, in order to prevent an illegitimate use by a person with a malicious intention.

However, in the case of such conventional information processing devices as those that request the administrator to change the preset initial administrator password, it may be impossible to change the administrator password right away from the request due to the absence of the administrator at the time of installation for some reasons.

Conventional information processing devices also include one that requests an administrator of the information processing device to change an administrator password and completely prevents the use of the information processing device until the password has been changed. This is very inconvenient because an installation technician is not allowed to perform an initial setting operation accompanying installation of the information processing device, and a user who wishes to use the information processing device is not allowed to perform any input operation, unless the administrator changes the administrator password.

It may be convenient for general users if the information processing device allows not only the administrator but also any general user who wishes to use the information processing device to perform an input operation between the first start-up of the information processing device and a change of the preset initial administrator password. However, this is not preferable from a security standpoint, because the information processing device also allows an illegitimate use by a person with a malicious intention (for example, theft of information saved therein or illegitimate software incursion), and the administrator may not notice the occurrence of the illegitimate use.

The present invention has been made in view of the above-described circumstances, and an object of the present invention is to provide an information processing device and a method for managing history information of the information processing device, which allow for monitoring of usage of the information processing device between the first start-up of the information processing device and a change of a preset initial administrator password, and a later review of the usage, so that an administrator or the like of the information processing device can determine, for example, occurrence of an illegitimate use and details thereof, and consider countermeasures against the illegitimate use, if any.

SUMMARY OF THE INVENTION

According to an aspect, the present invention provides an information processing device including: an operation processor; a storage in which an initial password being an initial setting of an administrator password is prestored; a logger that logs details of operations inputted using the operation processor, in the storage as operation history information; a password entry monitor that confirms whether or not the administrator password has been entered; a password changer that changes, upon the password entry monitor confirming that a password differing from the initial password has been entered, the administrator password and stores the entered password as a new administrator password; and a log presenter that presents the operation history information when the password changer has changed the administrator password.

In the information processing device, at least an executant, a date, and details of an operation are stored in association with one another in the operation history information stored in the storage.

In the information processing device, the logger logs details of operations inputted using the operation processor after the information processing device is started for the first time until the administrator password has been changed from the initial password to a different password, in the storage as the operation history information.

The information processing device further includes a display. A password change request screen for requesting that the administrator password be changed is displayed on the display in a situation in which the administrator password is unchanged and is still the initial password when the information processing device is started.

The information processing device further includes a display and a password authenticator that authenticates the administrator password entered. An administrator information setting screen for setting information related to an administrator including the administrator password is displayed on the display if the password authenticator confirms that the entered administrator password and the initial password match while the administrator password is unchanged and is still the initial password, and once the administrator password has been changed through the operation processor, the resulting administrator password is stored in the storage as a changed password, and the changed password is used for authentication of the administrator password to be performed by the password authenticator.

The information processing device further includes a display that displays information. The log presenter displays the operation history information on the display.

The information processing device further includes an image outputter that prints information. The log presenter prints out the operation history information on printing paper using the image outputter.

The information processing device further includes a communicator that communicates information via a network. The log presenter transmits the operation history information to another information processing device using the communicator via the network.

According to another aspect, the present invention provides a method for managing history information of an information processing device. The information processing device includes an operation processor through which a user of the information processing device inputs information and a storage in which an initial password being an initial setting of an administrator password is prestored. The method includes: logging details of operations inputted using the operation processor, in the storage as operation history information; confirming whether or not the administrator password has been entered; changing, upon a confirmation that a password differing from the initial password has been entered, the administrator password and storing the entered password as a new administrator password; and presenting the operation history information when the administrator password has been changed.

According to the present invention, details of operations inputted using the operation processor are logged and stored in the storage as the operation history information, and the operation history information is presented when the password changer has changed the administrator password. Usage of the information processing device is thus stored between the first start-up of the information processing device and a change of the preset initial administrator password. The presented operation history information enables the administrator or the like of the information processing device to review the usage of the information processing device later, to determine occurrence of, for example, an illegitimate use and details thereof, and to consider countermeasures against the illegitimate use, if any.

BRIEF DESCRIPTION OF THE DRAWINGS

FIG. 2 is an explanatory diagram showing examples of information stored in a storage according to the present invention.

FIG. 3 is an explanatory diagram showing examples of information stored in the storage according to the present invention.

FIG. 4 is an explanatory diagram showing an example of an initial setting menu screen displayed on a display according to the present invention.

FIG. 7 is an explanatory diagram showing an example of an administrator password entry screen displayed on the display according to the present invention.

FIG. 8 is an explanatory diagram showing an example of an administrator information setting screen displayed on the display according to the present invention.

DESCRIPTION OF THE PREFERRED EMBODIMENTS

The following describes embodiments of the present invention with reference to the accompanying drawings. Note that the present invention is not limited to the embodiments described below.

The present invention relates to information processing devices. Information processing devices include various devices such as personal computers, communication devices, display devices, and image forming apparatuses. The embodiments described below are applicable to any of these information processing devices.

Among the information processing devices, the following describes, as an embodiment, an image forming apparatus that receives input of a document containing information such as images, graphics, and characters, and that has functions such as a printing function.

Configuration of Image Forming Apparatus

Figure 1:
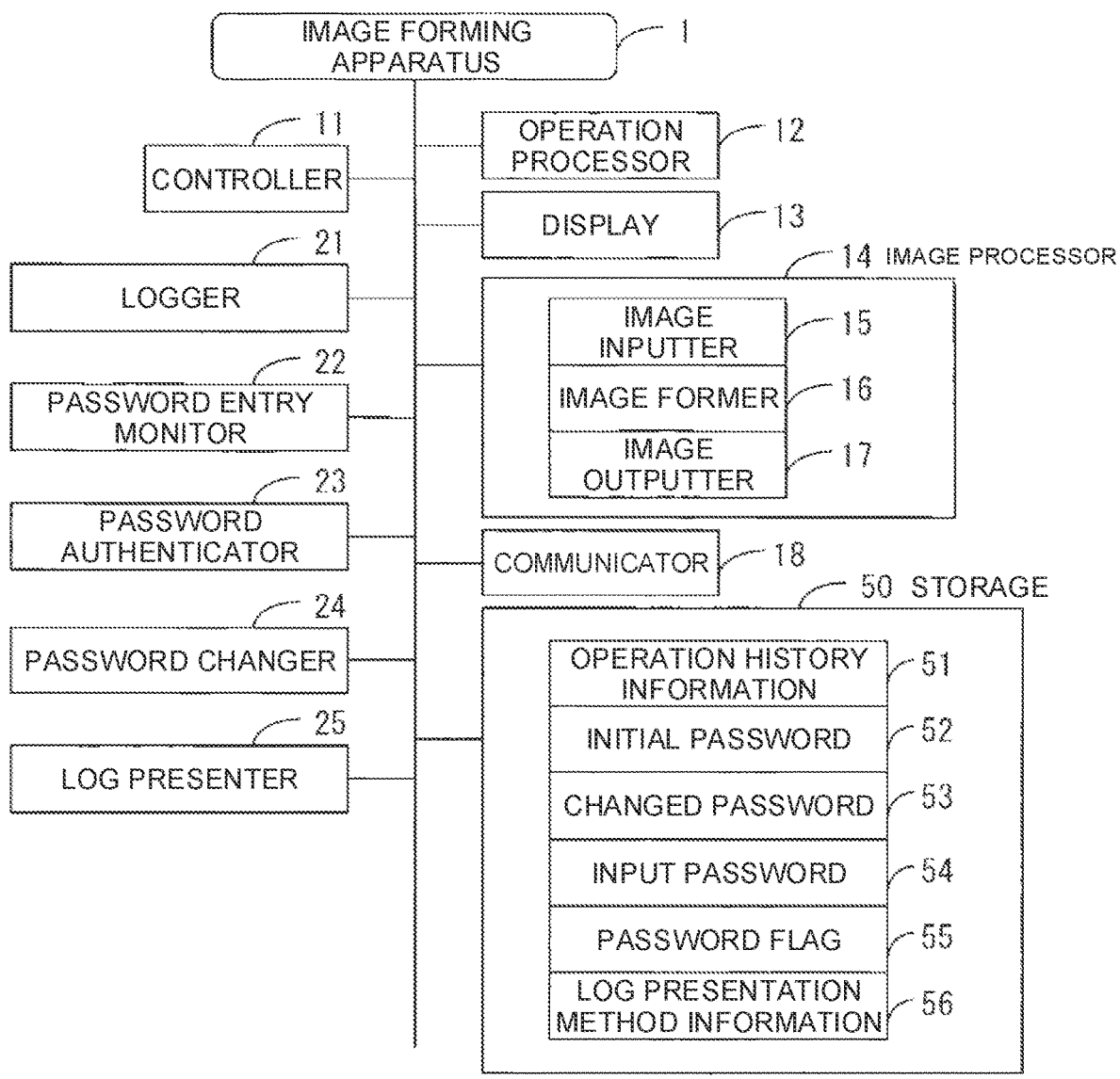
FIG. 1 is a block diagram illustrating a configuration of an example of an image forming apparatus according to the present invention.

FIG. 1 is a block diagram illustrating a configuration of an example of an image forming apparatus according to the present invention.

An image forming apparatus (also referred to below as a multifunction peripheral (MFP)) 1 processes image data. Examples thereof include an electronic apparatus having functions such as a copying function, a printing function, a document reading (scanning) function, a document editing function, a document saving function, a document transmitting (faxing, FAX) function, and a communication function.

The image forming apparatus 1 according to this embodiment of the present invention is described as having, in particular, a printing function and a document reading (scanning) function. However, the image forming apparatus 1 may have other functions.

In FIG. 1, the image forming apparatus (MFP) 1 according to the present invention mainly includes a controller 11, an operation processor 12, a display 13, an image processor 14, a communicator 18, a logger 21, a password entry monitor 22, a password authenticator 23, a password changer 24, a log presenter 25, and a storage 50.

The image processor 14 mainly includes an image inputter 15, an image former 16, and an image outputter 17.

The controller 11 is a component that controls operation of each constituent such as the operation processor and the image processor, and is implemented by a microcomputer that mainly includes a central processing unit (CPU), read-only memory (ROM), random-access memory (RAM), an input/output (I/O) controller, a timer, and the like.

The CPU organically operates various types of hardware based on a control program prestored in the ROM or the like, and executes functions according to the present invention, such as an image forming function and a logging function.

The CPU executes, based on a predetermined program, processing in each of the following function blocks among the constituents mentioned above: the logger 21, the password entry monitor 22, the password authenticator 23, and the password changer 24.

The operation processor 12 is an input device for a user of the image forming apparatus to input information. A predetermined input operation for operating the image forming apparatus is performed through the operation processor 12. For example, the operation processor 12 is a component through which information such as characters is inputted, and a function is selected and inputted. A keyboard, a mouse, a touch panel, and the like are usable as the operation processor 12.

Examples of keys to be operated by the user include an operation start key, a function selection key, and a setting key.

For example, the user operates the touch panel and enters a start key for a reading operation to execute a copying function and an administrator setting function.

Through the administrator setting function, in particular, the user operates the touch panel and enters a predetermined selection key to change administrator passwords, register users who use the image forming apparatus, and set up information for connection to a network.

The display 13 is a component that displays information. The display 13 displays information necessary for executing each function, results of the execution of the function, and the like in order to notify the user of such information. For example, in a case where a liquid crystal display (LCD), an organic electroluminescence (EL) display, or the like is employed as the display 13, and a touch panel is employed as the operation processor 12, the display 13 and the touch panel are stacked on one another.

On the display 13, for example, configuration of settings to be used for printing and the like by the image forming apparatus, information necessary for executing a function such as a document reading function, an operation screen for a selected function, a password entry screen, an administrator information setting screen, and the like are displayed using characters, symbols, graphics, still images, icons, animation, moving images, and the like.

In particular, according to the present invention, a password change request screen for requesting that an administrator password be changed is displayed on the display 13 as described below in a situation in which the administrator password is unchanged and is still an initial password when the information processing device is started.

The image processor 14 is a component that executes the image forming function, which is a main function of the image forming apparatus. The image processor 14 mainly includes the image inputter 15, the image former 16, and the image outputter 17.

The image inputter 15 is a component that mainly inputs predetermined image data. The image former 16 is a component that mainly converts the inputted image data to form information such as printable information. The image outputter 17 is a component that mainly outputs the formed information such as printable information on printing paper or the like.

The image inputter 15 is a component that inputs image data of a document containing images, characters, graphics, or the like. For example, the image inputter 15 reads a document placed on a document table or the like.

A scanner (reading device) that reads a document containing information is used as the image inputter 15.

In order to read documents, the image forming apparatus 1 includes a table on which a document is placed (document table) and a document cover for holding the document.

The image forming apparatus 1 may further include an automatic document feeder (ADF) that receives a plurality of sheets of document placed thereon and reads the document while automatically conveying the document one sheet at a time.

In this case, the document containing images or the like is read by the scanner, and resulting image data of the document is stored in the storage 50.

Various methods are available for inputting image information.

For example, an interface for connecting an external storage medium such as a USB flash drive is applicable to the image inputter 15.

Electronic data files containing image information and the like to input may be saved in an external storage medium such as a USB flash drive, and the storage medium such as a USB flash drive may be connected to an input interface such as a USB terminal. A desired electronic data file may be then read out of the storage medium such as a USB flash drive and stored in the storage 50 as input image data through a predetermined input operation performed using the operation processor 12.

For printing the input image data on a recording medium, for example, the image former 16 typically forms an image based on the input image data on the recording medium by performing the following processes in sequence: charging, irradiation, development, image transfer, cleaning, static elimination, and fixing.

In the development process, a toner is supplied from a toner cartridge to a developing device, an electrostatic latent image formed on a charged surface of a photosensitive drum is developed, and thus a toner image corresponding to the electrostatic latent image is formed. The toner image formed on the surface of the photosensitive drum is transferred onto the recording medium by a transfer device, and then heated and fixed onto the recording medium by a fixing device.

The image former 16 also converts the input image data to information in a form that can be transferred or displayed.

The image outputter 17 is a component that outputs input image data formed and is, for example, equivalent to a printer that prints information such as input image data. The image outputter 17 prints, on predetermined printing paper (paper medium), input image data obtained by reading a document.

However, outputting input image data is not limited to printing, and may include, for example, storing input image data obtained by scanning a document and faxing input image data obtained by scanning a document.

For example, storing input image data obtained by reading a document in an external storage medium such as a USB flash drive, transmitting input image data to another information processing device or a server via a network such as the Internet, and classifying and saving input image data into a specific save folder are also outputting image data.

The communicator 18 is a component that communicates information via a network. The communicator 18 performs data communication with another information processing device.

For example, the communicator 18 receives an electronic data file transferred from an information processing device such as a personal computer, a mobile terminal, or a server.

The communicator 18 also transfers input image data generated by the image forming apparatus 1 according to the present invention to an external storage device (such as a USB flash drive) connected to the image forming apparatus 1, or transmits, via the network, such input image data to an information processing device such as a server or a personal computer owned by a user who has inputted a document.

As the network, any existing communications networks including a local area network (LAN) and a wide area network such as the Internet are usable, and both wired and wireless communication methods may be used.

As described below, in order for an administrator of the image forming apparatus to determine occurrence of an illegitimate use and the like, details of operations (operation history information) stored in the storage 50 may be transmitted to an information processing device such as a personal computer owned by the administrator.

The logger 21 is a component that logs details of operations inputted into the image forming apparatus using the operation processor 12, in the storage 50 as operation history information.

For example, details of operations performed by the administrator including an operation for changing the administrator password and an operation for registering a user, and operations by a user including an operation for executing a function such as a copying function, a login operation, an operation for inputting image data, and an operation for transferring image data are logged and stored in the storage 50.

Details of operations are sequentially logged in chronological order as operation history information 51 such as shown in FIG. 3 described below. Details of each operation is associated with the name of the user who performed the operation (user name) and the date when the operation was performed. The operation history information 51 may also be referred to below as log information.

Details of operations may be classified according to operation executant, operation type, and the like, and may include, for example, operation items indicating classifications and operation setting information corresponding to what was actually done through the operation, which comes under the operation items.

For example, in a case where the administrator of the image forming apparatus logged into the image forming apparatus by entering the administrator's ID and password on Oct. 1, 2019, the following information is added to the operation history information. That is, a user name: "administrator", a date: "Jan. 10, 2019", an operation item as a detail of the operation: "administrator setting", and operation setting information as a detail of the operation: "login (ID, password)" are stored in association with one another.

For another example, in a case where a user 01 registered with the image forming apparatus logged into the image forming apparatus, and then sent a fax to a recipient's fax number "06-1234-5678" on Feb. 3, 2020, the following information is added to the operation history information. That is, a user name: "user 01", a date: "Mar. 2, 2020", an operation item as a detail of the operation: "user operation", and operation setting information as a detail of the operation: "faxing (06-1234-5678)" are stored in association with one another.

For example, the logger 21 may log details of all operations that are performed after the power of the image forming apparatus is turned on and until the power is turned off.

In order to allow for later determination of occurrence of an illegitimate use upon installation of the image forming apparatus, in particular, the logger 21 according to the present invention preferably logs details of all operations that are inputted using the operation processor 12 after the first start-up of the image forming apparatus until a change of the administrator password from an initial password to a different password, in the storage 50 as the operation history information 51.

The initial password is an initial setting of the administrator password described below, which is an administrator password (initial password KPW0) set and stored in the storage 50 prior to installation of the image forming apparatus.

The password entry monitor 22 is a component that confirms whether or not the administrator password has been entered. Upon entry of the administrator password, the password entry monitor 22 stores the entered password as an input password (INPW) 54 described below.

For the confirmation as to whether or not the administrator password has been entered, for example, an operation for displaying an administrator password entry screen is performed, and whether or not any information has been entered in a password entry field on the administrator password entry screen being displayed is determined.

The entered administrator password (input password INPW) is compared against, for example, the initial password KPW0 for administrator authentication.

The password authenticator 23 is a component that authenticates the entered administrator password.

The initial password KPW0 is preset and prestored as the administrator password. The password authenticator 23 checks whether or not the entered administrator password and the initial password KPW0 match while the administrator password is unchanged and is still the initial password KPW0.

The initial password KPW0 is stored as-is as a changed password KPW1 described below before the administrator password is changed.

In this case, for the authentication of the administrator password, the password authenticator 23 checks whether or not the entered administrator password (input password INPW) and the changed password KPW1 match.

If the input password INPW and the changed password KPW1 match, the authentication of the administrator password is determined to be successful. If the input password INPW and the changed password KPW1 do not match, the authentication of the administrator password is determined to be unsuccessful.

Once the administrator password has been changed, a password differing from the initial password KPW0 is stored as the changed password KPW1.

The authentication of the administrator password is determined to be successful if a legitimate administrator has changed the administrator password, and the legitimate administrator who has changed the administrator password enters, as the input password INPW, the same password as the changed password KPW1.

The authentication of the administrator password is determined to be unsuccessful if the administrator password has been changed, and an administrator or an illegitimate user who does not know about the change of the administrator password enters, as the input password INPW, the same password as the initial password KPW0.

According to the present invention, the administrator password is changed after the authentication of the administration password is determined to be successful.

In a case where the password authenticator 23 confirms that the entered administrator password INPW and the initial password KPW0 match while the administrator password is unchanged and is still the initial password KPW0, for example, the administrator information setting screen for setting information related to the administrator including the administrator password is displayed on the display 13.

Thereafter, once the administrator password has been changed through the operation processor 12, the resulting administrator password is stored in the storage 50 as the changed password KPW1.

The changed password KPW1 is used for the authentication of the administrator password to be performed by the password authenticator 23.

The password changer 24 is a component that changes the administrator password.

Upon the password entry monitor 22 confirming that a password differing from the initial password has been entered, the password changer 24 changes the administrator password and stores the entered password as a new administrator password.

In a case where a new administrator password is entered as an item of administrator information on the administrator information setting screen for administrator setting such as described below, for example, the entered new administrator password is stored as the changed password KPW1.

Details of such an operation for changing the administrator password is stored by being added to the operation history information upon execution thereof.

The log presenter 25 is a component that presents the operation history information stored in the storage 50.

In particular, the log presenter 25 presents the operation history information when the password changer 24 has changed the administrator password.

The log presenter 25 can present the operation history information by various methods.

For example, as described below, the log presenter 25 presents the operation history information to the administrator by displaying the details of the operations stored in the storage 50 on the display 13.

The log presenter 25 may alternatively present the operation history information to the administrator by printing out the details of the operations stored in the storage 50 on printing paper using the image outputter 17.

The log presenter 25 may alternatively present the operation history information to the administrator by transmitting the details of the operations stored in the storage 50 to another information processing device (for example, transmission to a personal computer owned by the administrator or transmission to the administrator's e-mail address) using the communicator 18 via the network.

The storage 50 is a component that stores information and programs necessary to implement the various functions of the image forming apparatus according to the present invention. For the storage 50, semiconductor storage devices such as ROM, RAM, and flash memory, and storage devices such as a hard disk drive (HDD) and a solid state drive (SSD), and other storage media are usable.

The operation history information 51, an initial password 52, a changed password 53, an input password 54, a password flag 55, and log presentation method information 56, for example, are stored in the storage 50.

Note here that the initial password (KPW0) 52, the changed password (KPW1) 53, and the input password (INPW) 54 are each an administrator password.

The administrator password refers to a password to be entered by the administrator of the image forming apparatus when the administrator logs into the image forming apparatus.

FIGS. 2 and 3 are explanatory diagrams showing examples of information stored in the storage 50.

FIG. 2 shows examples of the administrator password (initial password 52, changed password 53, input password 54), the password flag 55, and the log presentation method information 56.

FIG. 3 shows an example of the operation history information 51.

The operation history information 51 refers to information (log information) obtained by storing a history of details of operations inputted using the operation processor 12 of the image forming apparatus.

The history of details of operations is for a later review by the administrator or the like of the image forming apparatus, so that occurrence of an illegitimate use is determined based on the history.

Therefore, information necessary for determining occurrence of an illegitimate use is stored as the operation history information 51.

The operation history information 51 shown in FIG. 3 includes five pieces of history information, which are respectively given history numbers 1 to 5.

Names of operation executants (user names), dates, and details of operations including operation items and operation setting information are stored in an associated manner as the operation history information 51 shown in FIG. 3.

For example, the history information given history number 1 indicates that an administrator having a user name "administrator KA" performed an input operation for an operation item "administrator setting" on a date "18 Sep. 2019, 14:55:30", and a user having a name "user 22" was additionally registered through the input operation.

For another example, the history information given history number 3 indicates that a registered user having a user name "user 01" performed an input operation for an operation item "user operation" on a date "19 Sep. 2019, 12:20:38", and a function referred to as "faxing" to a destination fax number "06-1234-5678" was executed through the input operation.

For another example, the history information given history number 5 indicates that the administrator having a user name "administrator KA" performed an input operation for an operation item "administrator setting" on a date "21 Sep. 2019, 18:50:47", and a function referred to as "displaying registered user list" for checking users registered with the image forming apparatus was executed through the input operation.

The operation history information shown in FIG. 3 is merely an example, and the present invention is not limited thereto.

For example, the operation items include "guest user operation" for an unregistered and unauthorized user, in addition to "administrator setting" and "user operation".

Furthermore, the operation setting information include, for example, "registering destination IP address", "scan transmission", "printing", "copying", and "saving to external storage", in addition to "user addition" and "faxing".

The administrator of the image forming apparatus can find out whether or not the image forming apparatus was used illegitimately, or whether or not a registered user performed a setting change or a function that are prohibited at the time of the first start-up of the image forming apparatus, by checking the operation history information 51 such as shown in FIG. 3.

The initial password (KPW0) 52, which is an administrator password, refers to a password being an initial setting prestored in the storage 50 of the image forming apparatus.

The initial password (KPW0) 52 is, for example, stored in the storage 50 before shipment of the image forming apparatus.

For the first start-up following installation of the image forming apparatus according to the present invention, an installation technician or an administrator trying to perform initial setting-up work is required to log into the image forming apparatus by entering the administrator password.

The administrator password to be entered at the time of the login for the first start-up is the initial password (KPW0) 52.

The installation technician or the administrator can, for example, begin the installation work and the initial setting-up work by entering the initial password 52 on an initial setting menu screen.

For a plurality of image forming apparatuses, the same password may be set as the initial password (KPW0) 52 for each type of the image forming apparatuses, or different unique passwords may be set for each of the image forming apparatuses.

However, the initial password KPW0 needs to be publicly available in order to allow any installation technicians or administrators who install the image forming apparatuses to perform initial setting and maintenance work.

As long as the initial password KPW0 is publicly available, even a person scheming for an illegitimate use can know the initial password KPW0. Consequently, for example, an illegitimate user can log in using the initial password KPW0 and acquire information stored in the image forming apparatus or install software for an illegitimate use on the image forming apparatus.

In the cases where the initial password KPW0 prestored in the image forming apparatus is publicly available, therefore, the administrator password needs to be changed from the initial password KPW0 to a different password as soon as possible once the initial setting-up work is done, in order to prevent an illegitimate use by an illegitimate user.

The initial password KPW0 may be deleted after the administrator password has been changed. However, for an occasion when the image forming apparatus is reset to factory settings, the initial password KPW0 may be permanently kept stored without being deleted.

The changed password (KPW1) 53 refers to a password stored in the storage 50 after the administrator password has been changed.

In a case where "KANNEW1" differing from the initial password KPW0 is entered as a new password to change the administrator password, for example, "KANNEW1" is stored as the changed password (KPW1) 53.

Note that the same password as the initial password KPW0 is prestored as an initial setting of the changed password (KPW1) 53.

Once a password differing from the initial password KPW0 has been stored as the changed password KPW1, the changed password KPW1 is used as the administrator password from then on.

The input password (INPW) 54 refers to a password entered by the administrator when the administrator logs into the image forming apparatus.

For example, a request to enter the administrator password is made when the installation technician or the administrator logs in on the initial setting menu screen to begin installation work and initial setting-up work, and a password entered in response to the request is stored as the input password (INPW) 54. As administrator login authentication at the time of the first start-up of the image forming apparatus, this input password INPW is compared against the initial password KPW0, and the authentication is determined to be successful if these passwords match.

After the administrator password has been changed, the input password INPW is compared against the changed password KPW1, and the authentication is determined to be successful if these passwords match.

FIG. 2 shows examples of the administrator password (initial password KPW0, changed password KPW1, input password INPW).

In the case shown in FIG. 2, KANOLD0 is stored as the initial password KPW0, KANNEW1 is stored as the changed password KPW1, and KANNEW1 is stored as the input password INPW.

The input password INPW is compared against the changed password KPW1 since KANNEW1 differing from the initial password KPW0 is stored as the changed password KPW1. Accordingly, the administrator login authentication is determined to be successful if the input password INPW is KANNEW1 that matches the changed password KPW1.

The password flag 55 is information for checking whether or not the administrator password has been changed.

For example, as shown in FIG. 2, "T" is set and stored as the password flag (PWFLG) 55 if the administrator password has been changed, and "F" is set and stored as the password flag (PWFLG) 55 if the administrator password has not been changed.

As described above, "F" is set and stored as the password flag PWFLG if the same password as the initial password KPW0 is still stored as the changed password KPW1.

If a password differing from the initial password KPW0 is stored as the changed password KPW1, "T" is set and stored as the password flag PWFLG.

The log presentation method information 56 refers to information indicating a method set for presenting the operation history information (log information) to the administrator of the image forming apparatus.

The operation history information (log information) is presented to the administrator by the method set as the log presentation method information 56.

Examples of methods for presenting the operation history information (log information) include displaying, printing, and data communication as shown in FIG. 2. Any one of the presentation methods may be set and stored as the log presentation method information 56.

The operation history information (log information) is displayed on the display 13 of the image forming apparatus if "displaying" is set and stored as the log presentation method information 56.

The operation history information (log information) is printed out on predetermined printing paper using the image outputter 17 of the image forming apparatus if "printing" is set and stored as the log presentation method information 56.

The operation history information (log information) is transmitted to a personal computer or a mobile terminal owned by the administrator, or to an information processing device such as a management server using the communicator 18 if "data communication" is set and stored as the log presentation method information 56.

Note that the method for presenting the operation history information (log information) is not limited to the three methods described above, and other presentation methods such as faxing or a social network service may be employed.

Example of Logging Process

The following describes an example of a process for logging a history of input operations (logging process) by the logger 21.

Input operations are to be performed by an administrator, a user, a maintenance technician, or the like of the image forming apparatus.

However, a person who schemes for an illegitimate use (referred to below as an illegitimate user) can perform an input operation by impersonating a legitimate administrator between when the image forming apparatus is started for the first time since installation thereof (first start-up) and when the administrator password has been changed.

In order to allow for a later review of usage of the image forming apparatus and determination of occurrence of an illegitimate use by the administrator, therefore, all input operations performed on the image forming apparatus after the first start-up of the image forming apparatus shall be logged regardless of who performed the input operations.

As described above, details of the input operations are stored by being added to the operation history information 51.

Figure 10:
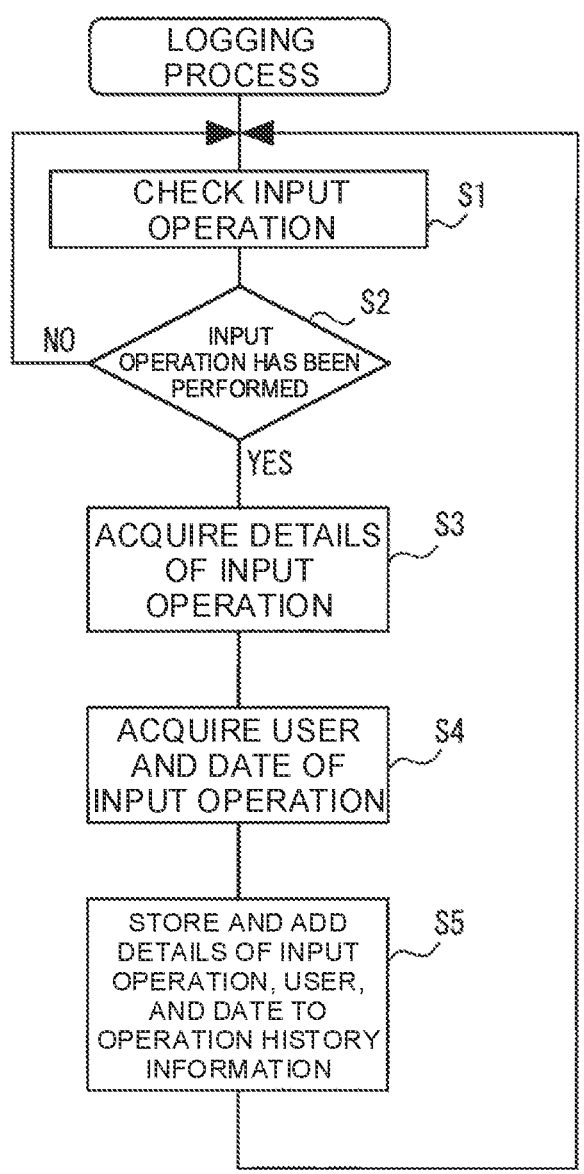
FIG. 10 is a flowchart showing an example of a logging process according to the present invention.

FIG. 10 shows a flowchart of an example of the logging process.

In step S1 in FIG. 10, the operation processor 12 checks whether or not an input operation has been performed.

For example, whether or not an input operation using a keyboard, a mouse, a touch panel, or the like has been performed is checked.

The process advances to step S3 if it is determined in step S2 that an input operation has been performed. Otherwise, the process returns to step S1.

In step S3, details of the input operation are acquired.

For example, which key has been entered and what has been selected using the mouse or the touch panel are acquired.

The details of the input operation include, for example, the operation item and the operation setting information as described above.

In step S4, a user name of the user who performed the input operation and a date when the input operation was performed are acquired.

For example, an ID can be acquired as the user name, because in principle, the administrator of the image forming apparatus and registered users log into the image forming apparatus through an authentication process using an ID and a password.

In a case where an unknown user performed the input operation, "unknown user" may be acquired as the user name.

A date and time (year, month, day, hour, minute, second) when an input using a key or the like was performed can be acquired as the date.

In step S5, the thus acquired details of the input operation, the user name, and the date are associated with one another and stored by being added to the operation history information 51.

Note that the information that is stored as the operation history information is not limited to those described above. For example, information necessary for reviewing usage of the image forming apparatus such as log information of touch operations (touch locations) or key operations may be stored.

Example of Password Changing Process

The following describes an example of a process related to the administrator password (monitoring of entry of the administrator password, authentication of the administrator password, changing of the administrator password).

Figure 11:
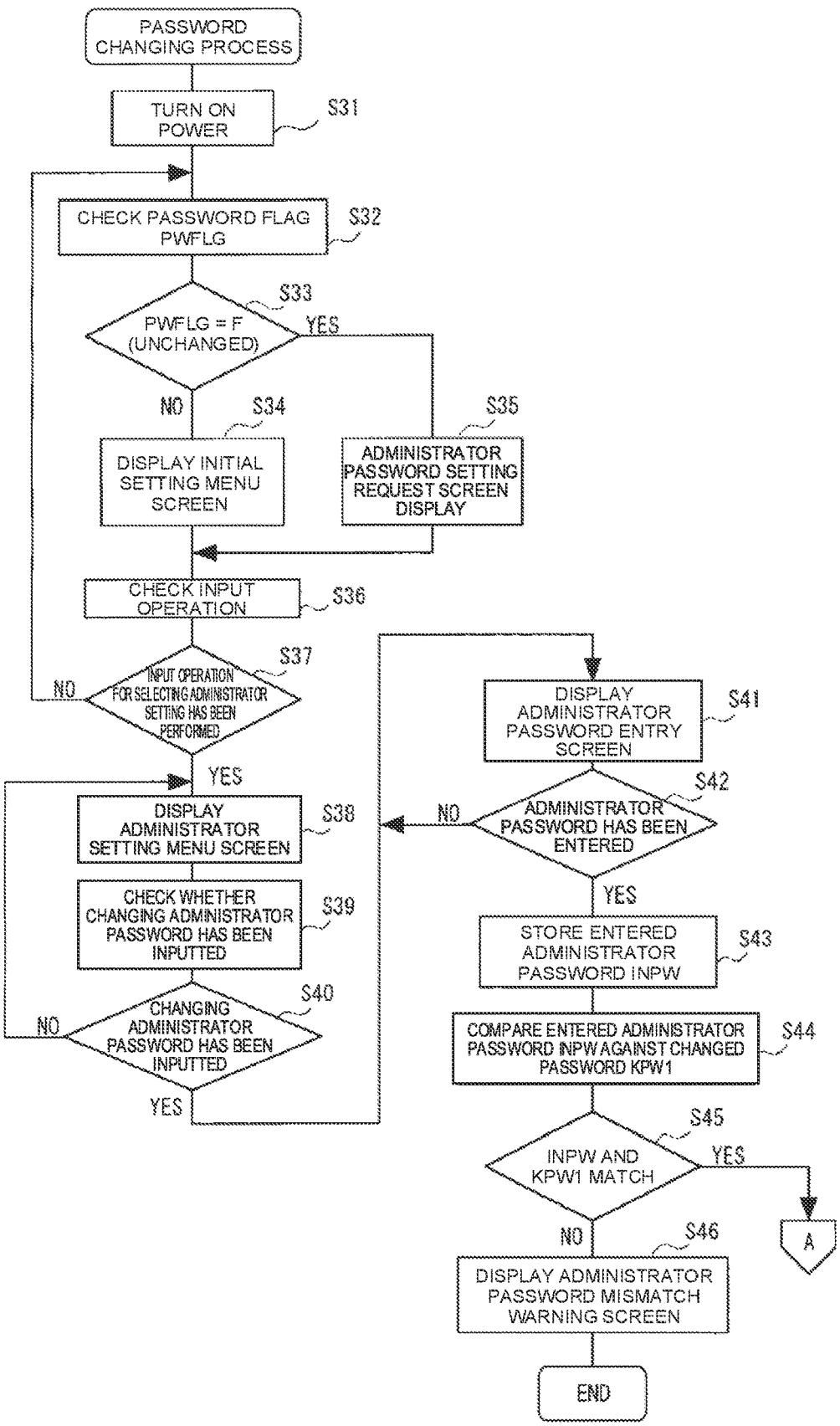
FIG. 11 is a flowchart showing an example of a password changing process according to the present invention.
Figure 12:
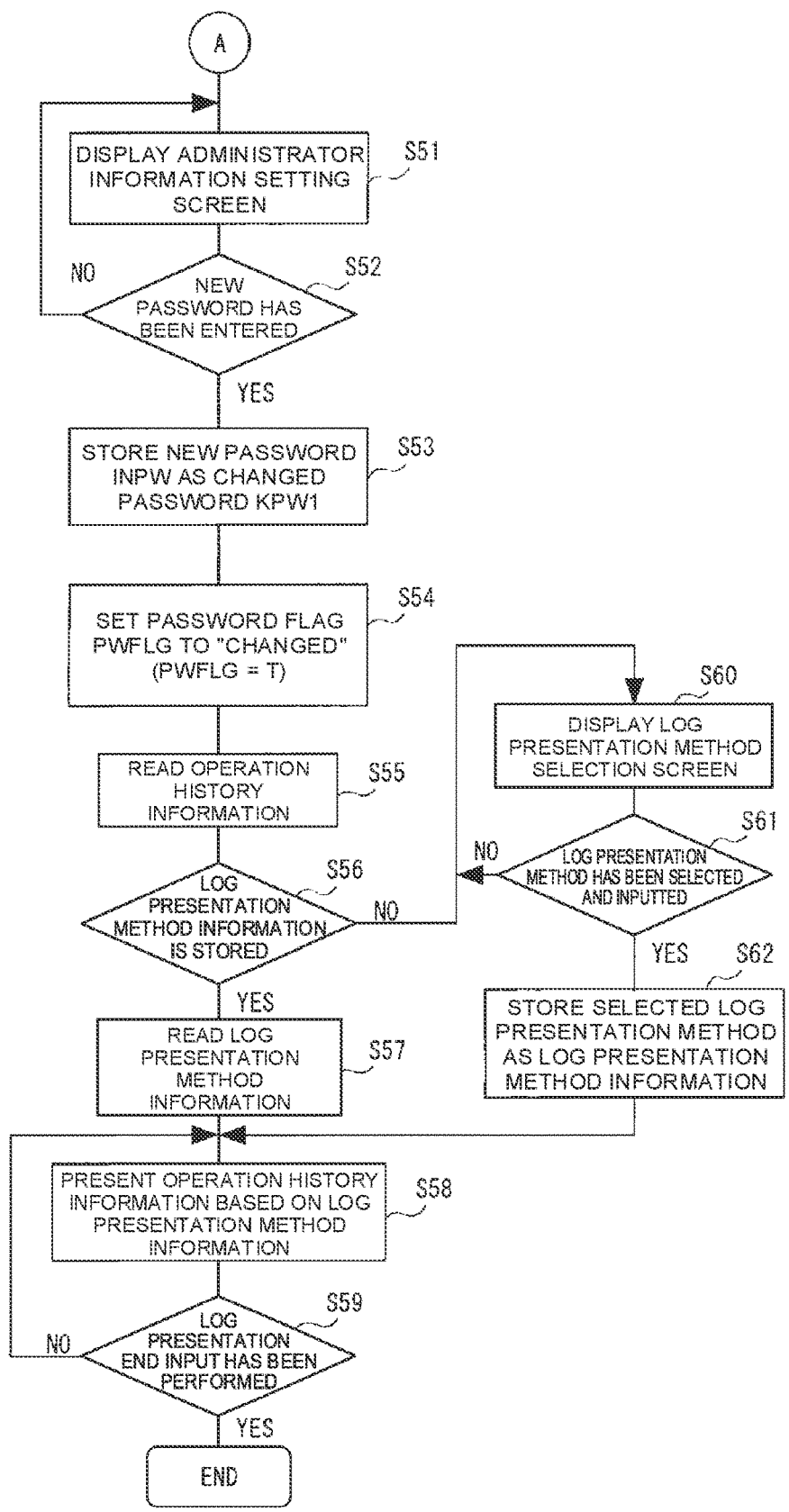
FIG. 12 is a flowchart showing an example of the password changing process according to the present invention.

FIGS. 11 and 12 show flowcharts of an example of a password changing process.

In step S31 in FIG. 11, in response to the power of the image forming apparatus being turned on, the controller 11 starts various types of hardware so that main functions of the image forming apparatus can be executed.

In step S32, the controller 11 checks the password flag PWFLG.

For example, as described above, the controller 11 checks whether PWFLG is "T" (changed) or "F" (unchanged) in step S32.

The process advances to step S35 if it is determined in step S33 that the password flag PWFLG is "F" (unchanged). Otherwise (PWFLG="T": changed), the process advances to step S34.

In step S34, the initial setting menu screen is displayed on the display 13.

FIG. 4 is an explanatory diagram showing an example of the initial setting menu screen displayed on the display.

This initial setting menu screen is displayed if the administrator password has been changed.

On this screen, for example, selectable functions (copying, scanning, administrator setting, and the like) and the following message are displayed: "Select a function to execute."

The administrator or a user can perform an input operation for selecting a function to execute while viewing this screen.

In step S35, the initial setting menu screen including a request to set the administrator password is displayed on the display 13.

Figure 5:
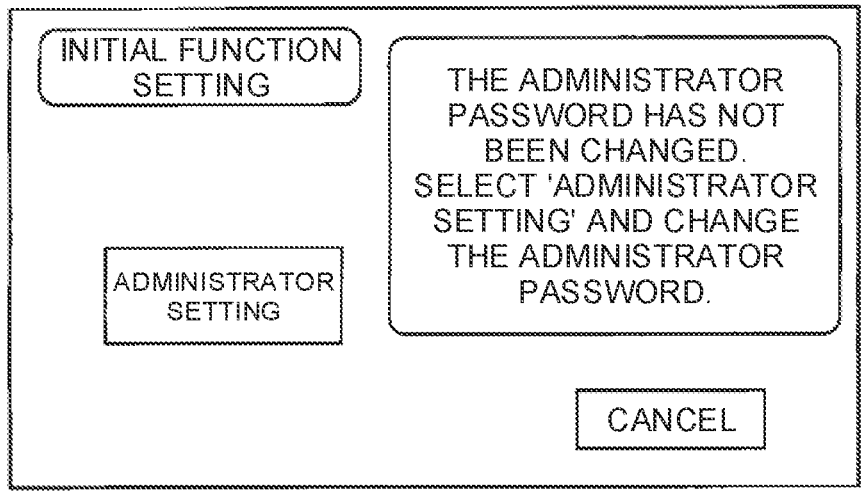
FIG. 5 is an explanatory diagram showing an example of the initial setting menu screen displayed on the display according to the present invention.

FIG. 5 is an explanatory diagram showing an example of the initial setting menu screen displayed on the display.

This initial setting menu screen is displayed if the administrator password has not been changed.

On this screen, for example, a selection area "administrator setting" and the following message are displayed: "The administrator password has not been changed. Select 'administrator setting' and change the administrator password."

In the case of the administrator, the administrator can perform an input operation for selecting "administrator setting" while viewing this screen.

In the case of a user who is not the administrator, however, the user selects, for example, a selection area "cancel".

In response to "cancel" being selected, for example, the initial setting menu screen illustrated in FIG. 4 may be displayed.

In step S36, the operation processor 12 checks whether or not an input operation has been performed.

The process advances to step S38 if it is determined in step S37 that an input operation for selecting "administrator setting" has been performed. Otherwise, the process returns to step S32.

Since only the process related to the administrator password is described here, the process is described as returning to step S32 if any other selection area than "administrator setting" has been selected. Normally, however, the selection of a selection area is followed by execution of the selected function. Functions other than "administrator setting" will be omitted here.

In step S38, an administrator setting menu screen is displayed on the display 13.

Figure 6:
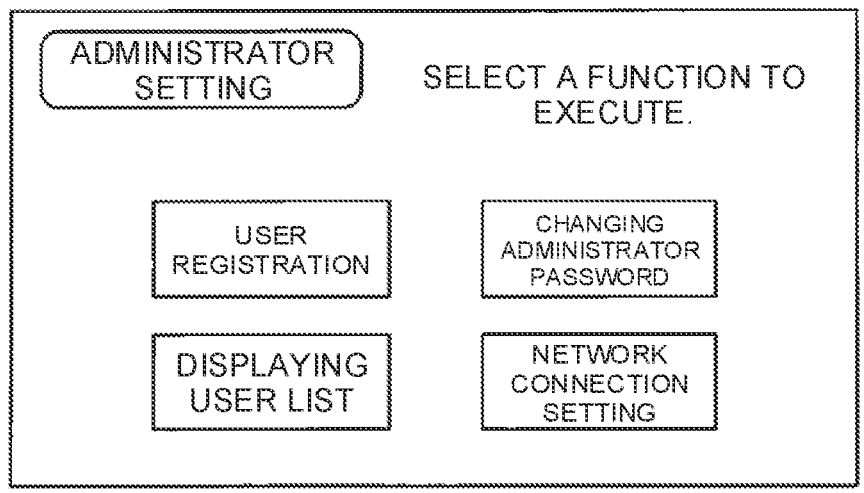
FIG. 6 is an explanatory diagram showing an example of an administrator setting menu screen displayed on the display according to the present invention.

FIG. 6 is an explanatory diagram showing an example of the administrator setting menu screen displayed on the display.

In FIG. 6, for example, selection areas for some functions related to "administrator setting" and the following message are displayed: "Select a function to execute."

Examples of functions related to "administrator setting" include "user registration", "changing administrator password", "displaying user list", and "network connection setting" as shown in FIG. 6.

However, the functions related to "administrator setting" are not limited to these functions. For example, other functions such as "energy saving setting", "copier setting", "fax setting", "scanner setting", and "printer setting" may be displayed as functions related to "administrator setting".

The administrator can perform an input operation for selecting a function to execute while viewing this screen.

The following flow describes the case where "changing administrator password" is selected and inputted from among the displayed functions.

In step S39, whether or not "changing administrator password" has been selected and inputted is checked.

The process advances to step S41 if it is determined in step S40 that "changing administrator password" has been inputted. Otherwise, the process returns to step S38.

Note that selection of another function is followed by execution of the selected function, but description thereof will be omitted here.

In step S41, the administrator password entry screen is displayed on the display 13.

FIG. 7 is an explanatory diagram showing an example of the administrator password entry screen displayed on the display.

In FIG. 7, for example, a display area for entering "administrator password" and the following message are displayed: "Enter the administrator password."

The administrator can enter the unchanged administrator password while viewing this screen.

The initial password KPW0 is entered if the administrator password has never been changed.

The same password as the password stored as the changed password KPW1 is entered if the administrator password has been changed.

After the password has been entered, a display area "OK" is selected and inputted to confirm the entry of the password.

The process advances to step S43 if it is determined in step S42 that the administrator password has been entered. Otherwise, the process returns to step S41.

In step S43, the entered administrator password is stored as the input password INPW.

In step S44, the entered administrator password (input password INPW) is compared against the changed password KPW1.

If the administrator password has never been changed and the same password as the initial password KPW0 being an initial setting is stored as the changed password KPW1, the input password INPW is compared against the initial password KPW0.

If the input password INPW and the changed password KPW1 match in step S45, the process advances to step S51 in FIG. 12.

If the input password INPW and the changed password KPW1 do not match, the process advances to step S46.

If the passwords do not match, which means that the administrator authentication is unsuccessful, a warning screen is displayed on the display 13 in step S46, indicating that the administrator password is incorrect and the administrator authentication is unsuccessful.

After the warning screen has been displayed, the process ends or advances to a request for a re-entry of the correct administrator password.

Figure 9:
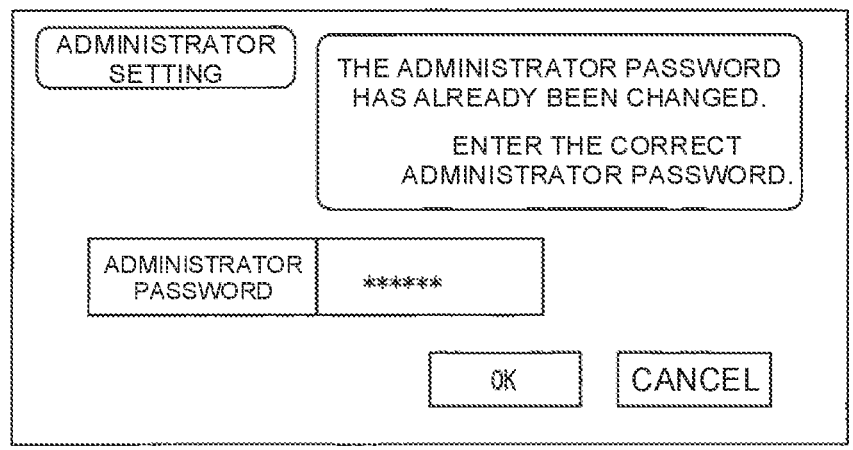
FIG. 9 is an explanatory diagram showing an example of a password mismatch warning screen displayed on the display according to the present invention.

FIG. 9 is an explanatory diagram showing an example of a password mismatch warning screen displayed on the display.

On the administrator password mismatch warning screen in FIG. 9, for example, a display area for entering "administrator password" and the following message are displayed: "The administrator password has already been changed. Enter the correct administrator password."

The process may then return to step S42 upon the administrator password being re-entered.

In step S51 in FIG. 12, the administrator information setting screen is displayed on the display 13.

FIG. 8 is an explanatory diagram showing an example of the administrator information setting screen displayed on the display.

The administrator enters the new administrator password changed from the initial password while viewing this screen.

On the administrator information setting screen in FIG. 8, for example, display areas for inputting administrator information including the administrator password and the following message are displayed: "Enter administrator information."

FIG. 8 shows a case where the new administrator password (new password), the administrator's e-mail address (e-mail), and the administrator's telephone number are entered as the administrator information.

However, the administrator information is not limited to these items of information. For example, age, department name, employee ID, social network service account may also be inputted.

After the new password and the like have been inputted, a display area "OK" is selected and inputted to confirm the entry of the administrator information.

The process advances to step S53 if it is determined in step S52 that the new password and the like have been entered. Otherwise, the process returns to step S51.

In step S53, the entered new password INPW is stored as the changed password KPW1.

In step S54, the password flag PWFLG is set to "T" indicating that the password has been changed (PWFLG =T).

In step S55, the operation history information 51 is read out of the storage 50.

The process advances to step S57 if it is determined in step S56 that some information is stored as the log presentation method information 56. Otherwise, the process advances to step S60.

In step S57, the log presentation method information 56 is read.

In step S58, the log presenter 25 presents the operation history information 51 based on the read log presentation method information 56.

For example, the operation history information 51 such as shown in FIG. 3 is displayed on the display 13 if "displaying" is stored as the log presentation method information 56.

For another example, the operation history information 51 is printed out on predetermined printing paper using the image outputter 17 if "printing" is stored as the log presentation method information 56.

For another example, the operation history information 51 is transmitted to a preregistered specific destination information processing device such as a personal computer owned by the administrator using the communicator 18 if "data communication" is stored as the log presentation method information 56.

The process ends if it is determined in step S59 that the administrator has performed an input meaning an instruction to end the log presentation (log presentation end input). Otherwise, the process returns to step S58.

In step S60, a log presentation method selection screen is displayed on the display 13 since the log presentation method information 56 has not been set.

On the log presentation method selection screen, for example, selection areas for a plurality of log presentation methods such as "displaying", "printing", and "data communication" are displayed, so that the administrator selects a desired presentation method.

The process advances to step S62 if it is determined in step S61 that the administrator has selected and inputted a log presentation method. Otherwise, the process returns to step S60.

In step S62, the selected log presentation method is stored as the log presentation method information 56. Thereafter, the process advances to step S58.

Embodiments of Changing Administrator Password and Presenting Operation History Information The following describes an embodiment in which the administrator password is changed, and subsequently the operation history information is presented.

In the following embodiment, the operation history information presentation method is "displaying".

Embodiment 1

As Embodiment 1, a case is described where the legitimate administrator changes the administrator password from the initial password KPW0 to a different password.

Operation 01:

An installation technician of the image forming apparatus installs the image forming apparatus and performs an initial setting operation accompanying the installation.

At this point, the administrator password is still the preset initial password KPW0, and the changed password KPW1 is also the preset initial password KPW0.

The installation technician can log into the image forming apparatus using, for example, the known initial password KPW0 and perform the initial setting operation accompanying the installation.

This initial setting operation is stored as an "operation 01" by being added to the operation history information 51.

Operation 02:

A registered user performs an operation for executing a specific function of the image forming apparatus before the administrator of the image forming apparatus changes the administrator password.

If the administrator of the image forming apparatus has already registered information of this user, the user can log into the image forming apparatus using the registered information.

This operation performed by the user for executing the specific function is stored as an "operation 02" by being added to the operation history information 51.

Operation 03:

The administrator of the image forming apparatus performs an operation for changing the administrator password.

For example, as shown in FIG. 8, the administrator enters a new password differing from the initial password KPW0. The entered new password is stored as the changed password KPW1.

This operation for changing the administrator password is stored as an "operation 03" by being added to the operation history information 51.

Action of the Image Forming Apparatus:

Since the administrator password has been changed through the operation 03, the operation history information 51 is presented as in step S58 in FIG. 12.

The operation history information 51 now includes at least the three operations described above (operations 01 to 03), and thus these three operations are displayed.

The operation history information 51 may be automatically displayed whenever the administrator password is changed.

Alternatively, the operation history information 51 may be displayed in response to the administrator performing a specific operation (operation for requesting that the operation history information 51 be displayed).

The administrator can check operations and functions inputted and executed between the installation of the image forming apparatus and the change of the administrator password by viewing the displayed operation history information 51.

For example, the administrator can determine whether or not an illegitimate operation has been performed by viewing the operation history information 51 such as shown in FIG. 3 and checking the details of the operations.

If no illegitimate operation is found, the administrator does not need to take any special action.

If any illegitimate operation is found, the administrator can analyze the illegitimate operation and consider necessary countermeasures.

Embodiment 2

As Embodiment 2, a case is described where a registered legitimate user performs a specific operation, and thereafter the administrator changes the administrator password from the initial password KPW0 to a different password.

The specific operation refers to a setting operation predetermined by the administrator, which is not an illegitimate operation but an operation or a function that the administrator does not want any user to perform before the administrator password is changed (referred to below as a prohibited operation).

Examples of prohibited operations include an operation for transmitting image data stored in the image forming apparatus to another information processing device, an operation for faxing such image data, an operation for saving such image data in an external storage, and an operation for e-mailing such image data.

These operations or functions have the potential for information leakage and an illegitimate use.

The prohibited operations may be preset and prestored in the storage 50 of the image forming apparatus by the administrator or an installation technician.

Operation 01:

As in the case of Embodiment 1, an installation technician of the image forming apparatus installs the image forming apparatus and performs an initial setting operation accompanying the installation.

At this point, the administrator password is still the preset initial password KPW0, and the changed password KPW1 is also the preset initial password KPW0.

The installation technician can log into the image forming apparatus using, for example, the known initial password KPW0 and perform the initial setting operation accompanying the installation.

This initial setting operation is stored as an "operation 01" by being added to the operation history information 51.

Operation 02:

As in the case of Embodiment 1, a registered user performs an operation for executing a specific function of the image forming apparatus before the administrator of the image forming apparatus changes the administrator password.

If the administrator of the image forming apparatus has already registered information of this user, the user can log into the image forming apparatus using the registered information.

This operation performed by the user for executing the specific function is stored as an "operation 02" by being added to the operation history information 51.

In Embodiment 2, the operation 02 is a "faxing operation", which is a prohibited operation.

In this case, "faxing operation" is stored as one of details of operations in the operation history information 51.

Operation 03:

The administrator of the image forming apparatus performs an operation for changing the administrator password.

For example, as shown in FIG. 8, the administrator enters a new password differing from the initial password KPW0. The entered new password is stored as the changed password KPW1.

This operation for changing the administrator password is stored as an "operation 03" by being added to the operation history information 51.

Action of the Image Forming Apparatus:

Since the administrator password has been changed through the operation 03, the operation history information 51 is presented as in step S58 in FIG. 12.

The operation history information 51 now includes at least the three operations described above (operations 01 to 03), and thus these three operations are displayed.

In Embodiment 2, the displayed operation history information 51 includes the "faxing operation" being a prohibited operation.

The administrator can find that the "faxing operation" being a prohibited operation was performed by a user between the installation of the image forming apparatus and the change of the administrator password by viewing the displayed operation history information 51.

For example, by viewing the operation history information 51 such as shown in FIG. 3 and checking the details of the operations, the administrator can find in history number 3 that the "faxing operation" being a prohibited operation was performed by the user 01.

Thus, if a prohibited operation performed by a user is found, the administrator can consider necessary countermeasures and take an appropriate action on the user who performed the prohibited operation.

In a case where prohibited operations set by the administrator are prestored in the storage 50, the log presenter 25 may automatically check whether or not the operation history information 51 includes any prohibited operation when presenting the operation history information 51 and display, if the operation history information 51 includes a prohibited operation, information indicating that the prohibited operation was performed together with the operation history information 51.

Alternatively, the log presenter 25 may highlight the row of history number 3 involving the prohibited operation or display the row of history number 3 in a different color from rows of the other history numbers.

This enables the administrator to easily and reliably recognize the occurrence of the prohibited operation.

Embodiment 3

As Embodiment 3, a case is described where an illegitimate user impersonating the legitimate administrator logs into the image forming apparatus using the initial password KPW0 being the administrator password and performs an operation related to a specific administrator setting.

In this case, the illegitimate user can use the image forming apparatus for illegitimate purposes, but the legitimate administrator can find out the occurrence of the illegitimate use later and consider countermeasures.

Operation 01:

As in the case of Embodiment 1, an installation technician of the image forming apparatus installs the image forming apparatus and performs an initial setting operation accompanying the installation.

At this point, the administrator password is still the preset initial password KPW0, and the changed password KPW1 is also the preset initial password KPW0.

The installation technician can log into the image forming apparatus using, for example, the known initial password KPW0 and perform the initial setting operation accompanying the installation.

This initial setting operation is stored as an "operation 01" by being added to the operation history information 51.

Operation 02:

An illegitimate user, who is not the administrator of the image forming apparatus, performs an operation for logging into the image forming apparatus using the initial password KPW0 before the administrator password is changed.

This login operation performed by the illegitimate user is stored as an "operation 02" by being added to the operation history information 51.

This login operation itself is the same as an operation to be performed by the legitimate administrator, and is therefore added to the operation history information 51 as a legitimate login operation.

Operation 03:

After the login, the illegitimate user performs an operation related to an administrator setting.

For example, the illegitimate user performs an operation "displaying registered user list" under the administrator setting.

For another example, the illegitimate user can perform an operation "scan transmission" to be performed by a user.

This administrator setting-related operation performed by the illegitimate user is stored as an "operation 03" by being added to the operation history information 51.

This operation is also the same as an operation to be performed by the legitimate administrator or a legitimate user, and is therefore added to the operation history information 51 as a legitimate operation.

Operation 04:

The legitimate administrator of the image forming apparatus performs an operation for changing the administrator password.

For example, as shown in FIG. 8, the administrator enters a new password differing from the initial password KPW0. The entered new password is stored as the changed password KPW1.

This operation for changing the administrator password is stored as an "operation 04" by being added to the operation history information 51.

Action of the Image Forming Apparatus:

Since the administrator password has been changed through the operation 04, the operation history information 51 is presented as in step S58 in FIG. 12.

The operation history information 51 now includes at least the four operations described above (operations 01 to 04), and thus these four operations are displayed.

The legitimate administrator of the image forming apparatus checks operations and functions inputted and executed between the installation of the image forming apparatus and the change of the administrator password by viewing the displayed operation history information 51.

For example, the legitimate administrator recognizes the login operation stored as the operation 02 and the operation "displaying registered user list" stored as the operation 03 to be operations that the legitimate administrator did not perform. In this case, the legitimate administrator can determine that these operations may be illegitimate operations performed by an illegitimate user.

If no illegitimate operation is found, the legitimate administrator does not need to take any special action.

If the legitimate administrator determines that an illegitimate operation may have been performed, the legitimate administrator can analyze the illegitimate operation and consider necessary countermeasures.

For example, based on the fact that the operation "displaying registered user list" was performed, the legitimate administrator recognizes the possibility of leakage of personal information of registered users and investigates the leakage of personal information of the users.

Embodiment 4

As Embodiment 4, a case is described where an illegitimate user impersonating the legitimate administrator changes the administrator password from the initial password KPW0 to a different password, and then performs an operation related to a specific administrator setting.

In this case, the illegitimate user can use the image forming apparatus for illegitimate purposes, but the legitimate administrator can find out the occurrence of the illegitimate use later, and consider countermeasures.

Operation 01:

As in the case of Embodiment 1, an installation technician of the image forming apparatus installs the image forming apparatus and performs an initial setting operation accompanying the installation.

At this point, the administrator password is still the preset initial password KPW0, and the changed password KPW1 is also the preset initial password KPW0.

The installation technician can log into the image forming apparatus using, for example, the known initial password KPW0 and perform the initial setting operation accompanying the installation.

This initial setting operation is stored as an "operation 01" by being added to the operation history information 51.

Operation 02:

An illegitimate user, who is not the administrator of the image forming apparatus, performs an operation for logging into the image forming apparatus using the initial password KPW0 before the administrator password is changed.

This login operation performed by the illegitimate user is stored as an "operation 02" by being added to the operation history information 51.

This login operation itself is the same as an operation to be performed by the legitimate administrator, and is therefore added to the operation history information 51 as a legitimate login operation.

Operation 03:

The illegitimate user performs an operation for changing the administrator password.

For example, as shown in FIG. 8, the illegitimate user enters a new password differing from the initial password KPW0. The entered new password is stored as the changed password KPW1.

This operation for changing the administrator password is stored as an "operation 03" by being added to the operation history information 51.

This operation itself for changing the password is the same as an operation to be performed by the legitimate administrator, and is therefore added to the operation history information 51 as a legitimate operation.

Operation 04:

After the login, the illegitimate user performs an operation related to an administrator setting.

For example, the illegitimate user performs an operation "displaying registered user list" under the administrator setting.

This administrator setting-related operation performed by the illegitimate user is stored as an "operation 04" by being added to the operation history information 51.

This operation is also the same as an operation to be performed by the legitimate administrator or a legitimate user, and is therefore added to the operation history information 51 as a legitimate operation.

Operation 05:

The legitimate administrator of the image forming apparatus performs an operation for logging into the image forming apparatus using the administrator password.

The legitimate administrator does not know about the operation 03 and therefore assumes that the current administrator password is still the initial password KPW0. Accordingly, the legitimate administrator performs the operation for logging into the image forming apparatus by entering the initial password KPW0.

However, the administrator password has already been changed through the operation 03, and a password differing from the initial password KPW0 has been set as the changed password KPW1.

The administrator authentication therefore ends up being unsuccessful as a result of the legitimate administrator entering, as the input password INPW, the initial password KPW0 differing from the changed password KPW1.

Action of the Image Forming Apparatus:

If the administrator authentication is unsuccessful, for example, an administrator password mismatch warning screen such as shown in FIG. 9 is displayed.

The legitimate administrator would fail in the administrator authentication if the legitimate administrator performs an operation for logging into the image forming apparatus again by entering the initial password KPW0.

The legitimate administrator who sees the unsuccessful administrator authentication can determine that an illegitimate user may have logged into the image forming apparatus and changed the administrator password, as a result of failing in the administrator authentication with the initial password KPW0 despite the fact that the legitimate administrator has never changed the administrator password.

In this case, the legitimate administrator cannot log into the image forming apparatus or display and check the operation history information 51, but can determine that an illegitimate operation may have been performed and consider necessary countermeasures based on the situation in which the legitimate administrator cannot log in.

The legitimate administrator may, for example, take actions and measures such as resetting the image forming apparatus to factory settings, resetting the administrator password to an initial setting (changing the changed password KPW1 back to the initial password KPW0), or getting in touch with a vendor of the image forming apparatus.

What is claimed is:

1. An information processing device comprising:
    an operation processor;
    a storage in which an initial password being an initial setting of an administrator password is prestored;
    a logger that logs details of operations inputted using the operation processor, in the storage as operation history information;
    a password entry monitor that confirms whether or not the administrator password has been entered;
    a password changer that changes, upon the password entry monitor confirming that a password differing from the initial password has been entered, the administrator password and stores the entered password as a new administrator password; and
    a log presenter that presents the operation history information when the password changer has changed the administrator password.

2. The information processing device according to claim 1, wherein at least an executant, a date, and details of an operation are stored in association with one another as the operation history information stored in the storage.

3. The information processing device according to claim 1, wherein the logger logs details of operations inputted using the operation processor after the information processing device is started for the first time until the administrator password has been changed from the initial password to a different password, in the storage as the operation history information.

4. The information processing device according to claim 1, further comprising a display, wherein
    a password change request screen for requesting that the administrator password be changed is displayed on the display in a situation in which the administrator password is unchanged and is still the initial password when the information processing device is started.

5. The information processing device according to claim 1, further comprising:
    a display; and
    a password authenticator that authenticates the administrator password entered, wherein
    after an administrator information setting screen for setting information related to an administrator including the administrator password is displayed on the display if the password authenticator confirms that the entered administrator password and the initial password match while the administrator password is unchanged and is still the initial password, once the administrator password has been changed through the operation processor, the resulting administrator password is stored in the storage as a changed password, and the changed password is used for authentication of the administrator password to be performed by the password authenticator.

6. The information processing device according to claim 1, further comprising a display that displays information, wherein
    the log presenter displays the operation history information on the display.

7. The information processing device according to claim 1, further comprising an image outputter that prints information, wherein
    the log presenter prints out the operation history information on printing paper using the image outputter.

8. The information processing device according to claim 1, further comprising a communicator that communicates information via a network, wherein
    the log presenter transmits the operation history information to another information processing device using the communicator via the network.

9. A method for managing history information of an information processing device,
    the information processing device including an operation processor through which a user of the information processing device inputs information and a storage in which an initial password being an initial setting of an administrator password is prestored,
    the method comprising:
    logging details of operations inputted using the operation processor, in the storage as operation history information;
    confirming whether or not the administrator password has been entered;
    changing, upon a confirmation that a password differing from the initial password has been entered, the administrator password and storing the entered password as a new administrator password; and
    presenting the operation history information when the administrator password has been changed.

* * * * *